Feb. 13, 1968 F. KÜNEMUND ETAL 3,369,200

BENDING BANDPASS ELECTROMECHANICAL FILTER WITH ASYMMETRY FOR IMPROVED SELECTIVITY

Filed Jan. 26, 1965 3 Sheets-Sheet 1

Inventors.
Friedrich Künemund,
Hans Albsmeier, &
Karl Traub
By [illegible] Attys.

Inventors.
Friedrich Künemund,
Hans Albsmeier, &
Karl Traub.
By: Stiee & Stiee Attys.

Inventors.
Friedrich Künemund,
Hans Albsmeier, &
Karl Traub.
By Spee & Spee Attys.

United States Patent Office 3,369,200
Patented Feb. 13, 1968

3,369,200
BENDING BANDPASS ELECTROMECHANICAL FILTER WITH ASYMMETRY FOR IMPROVED SELECTIVITY

Friedrich Künemund, Hans Albsmeier, and Karl Traub, Munich, Germany, assignors to Siemens Aktiengesellschaft, a corporation of Germany Filed Jan. 26, 1965, Ser. No. 428,174
Claims priority, application Germany, Jan. 30, 1964, S 89,284
14 Claims. (Cl. 333—71)

ABSTRACT OF THE DISCLOSURE

A bender bandpass electromagnetic filter having a pair of resonators, a coupling bridge joining the resonators to transmit vibrations from one resonator to the other, electrostrictive transducers in each of the resonators for the transition from electrical to mechanical vibrations and mechanical to electrical vibrations, and at least one asymmetry on each resonator, for coupling two perpendicular bending vibrations of the same frequency on each resonator.

The invention relates to an electromechanical filter consisting of at least two mechanical resonators coupled with one another by a coupling bridge, executing bending vibrations, and transducers for the transition from electrical to mechanical vibrations or for the transition from mechanical to electrical vibrations.

In the construction of electromechanical filters, several mechanical vibrators are coupled with one another over coupling bridges. For the transition from electrical to mechanical and/or from mechanical to electrical vibrations, at least the end resonators of such a filter are provided with so-called electromechanical transducers. As compared to filters built up with concentrated circuit elements, mechanical filters are particularly distinguished above all because of the high quality of the individual resonators and their small space requirements. On the other hand, mechanical resonators present a certain structural unit dictated by their volumetrical geometric form, so that it is not possible without difficulty to achieve therewith all circuits which may be provided by concentrated circuit elements. This problem especially comes into prominence when it is essential to construct so-called pole-generating filter circuits. The reproduction of such pole-generating circuit elements by mechanical resonators, however, involves a number of difficulties. One of the main difficulties resides especially in the fact that in many mechanical vibrators, besides the main vibration, side vibrations are also excitable which, under some circumstances, evoke, at a relatively short distance from the actual filter pass range, attenuation break-throughs in the blocking range of the filter and thus make themselves troublesomely noticeable with respect to the selectivity of such a filter.

The invention has as its problem to overcome the above described difficulties in a simple manner. Among other things it is to be achieved that in both the resonators executing bending vibrations and also in the coupling elements, two types of vibration are excited, whereby there results on the one hand a filter which is extremely poor with respect to the generation of side waves, and on the other hand, freely selectable attenuation poles can be generated within wide limits.

Proceeding from an electromechanical filter consisting of at least two mechanical resonators coupled with one another by a coupling bridge, executing bending vibrations, and transducers for the transition from electrical to mechanical vibrations, or for the transition from mechanical to electrical vibrations, this problem is solved according to the invention by the feature that the configurations and dimensions of the resonators are so selected that two bending vibrations, preferably perpendicular to one another, occur at least approximately at the same frequency. Coupling is effected therebetween through an asymmetry provided on the vibrators in the prescribed degree, and that the coupling bridge is secured to the resonators in a zone of a loop or antinode (maximum amplitude) corresponding to the particular bending vibrations.

Advantageous forms of construction result if the resonators consist of bars having a square cross-section, in which at least one corner edge is flattened or beveled preferably over the entire length of the bar, and if the coupling bridge has a rectangular cross-section, or if the resonators consist of bars with square cross-section, in which at least one corner edge is flattened or beveled, preferably over the entire length of the bar, and in which the coupling bridge has a circular cross-section.

An advantageous form of execution of a mechanical filter can be achieved, furthermore, by an arrangement in which the resonators consist of bars of square cross-section, the bars being provided with at least one sickle or almond-shaped recess arranged diagonally and/or a sickle or almond-shaped protuberance, and in which the coupling bridges have a rectangular and/or circular cross-section.

Further, it is favorable if the resonators consist of bars of circular section which are provided with a sickle or almond-shaped recess and/or a sickle or almond-shaped protuberance, and if the coupling bridges have rectangular and/or circular cross-section, or if the resonators consist of bars of circular cross-section which are provided with a flattened portion extending preferably over the entire vibrator length, and if the coupling bridges have rectangular and/or circular cross-section.

In the drawings, wherein like reference characters indicate like or corresponding parts:

FIG. 1 is a perspective view of a filter, having two resonators, embodying the invention;

FIGS. 2 and 3 schematically illustrate forms of vibration in the longitudinal coupling of the resonators 10 and 11, as viewed in the direction B of FIG. 1;

FIGS. 4 and 5 schematically illustrate forms of vibration in the bending coupling of the resonators, as viewed in the direction C of FIG. 1;

Figure 1:
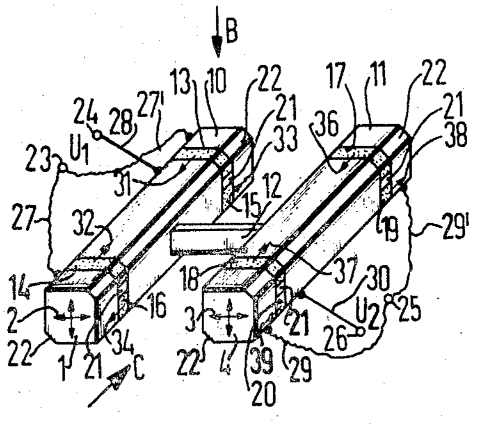

FIG. 1 illustrates a mechanical filter in which the two mechanical resonators 10 and 11 are coupled with one another over a coupling bridge 12. The resonators 10 and 11 consist, in this embodiment, of steel, but the use of other materials with high mechanical quality, such as, for example, quartz glass, also is possible. The resonators 10 and 11 are subdivided by the plate-like elements 13 to 20, which consist of an electrostrictive material. The plates 13 to 20 may consist of a lead ceramic material, such as is known, for example, by the trade name PZT6 of the Clevite firm. For the connection of the electrostrictive plates 13 to 20 with the resonators 10 and 11 consisting of steel there is vaporized, for example in a vacuum, onto the plates 13 to 20, in a manner known per se, an electrically conductive coating, which is then solderable to the steel resonators. The electrostrictive plates are installed in the vibrator bars in such a way that gaps 21 remain between them, which all lie in the middle planes of the resonators and extend parallel to one another. In the example illustrated, the resonators 10 and 11 have a square cross-section, each two diagonally opposite corners being provided with flattened or beveled portions 22. To the outer parts of the resonator 10 there lead from a connector terminal 23 two flexible feed conductors 27 and 27', and to the middle portion there leads from a connector terminal 24 a feed conductor 28. In similar manner there lead to the outer parts of the resonator 11, from a terminal 25, to two conductors 29 and 29' and from a connector terminal 26 a conductor 30 to the middle portion. The conductors 28 and 30 are so affixed to the resonators that they extend at an angle of about 45° to the upper or lower resonator boundary surface and, with adequate thickness can be used for the purpose of supporting the entire filter in a casing (omitted in the drawing for the purposes of clarity).

The manner of electrical operation of the mechanical filter illustrated in FIG. 1 can be explained as follows: If there is applied to the terminals 23 and 24 an input alternating voltage $U_1$, the electrostrictive plates 13 and 14 are expanded in the one-half-cycle of the alternating voltage $U_1$, since there is impressed on them by a direct current pretreatment a polarization in the direction of the arrows 31 and 32. The plates 15 and 16 are polarized in the direction of arrows 33 and 34, which are opposite to the polarization of the plates 13 and 14, so that in the same half-cycle of the input alternating voltage $U_1$ they contract. If the polarity of the input alternating voltage $U_1$ is reversed, then, correspondingly, the plates 15 and 16 are expanded, while the plates 13 and 14 are contracted. In this manner the resonator 10 always executes pronounced bending vibration in the direction of the double arrow 1 when its own resonant frequency corresponds at least approximately to the frequency of the applied alternating voltage $U_1$. Through the diagonally oppositely disposed flattened portions 22, the symmetry of the resonator 10 is disturbed. This disturbance has as its consequence that simultaneously therewith a bending vibration is excited in the resonator in the direction of the double arrow 2, the frequency of which, due to the square cross-section of the resonator, practically agrees with the frequency of the bending vibration running in the direction of the double arrow 1. The resonator 10 thus executes two bending vibrations extending perpendicular to one another, which are coupled with one another over the flattened portions 22. These two bending vibrations are transmitted to the resonator 11 over the coupling bridge 12, which is attached to the resonator in the zone of an antinode corresponding to the bending vibrations. For the manner of oscillation designated by the numeral 2, the coupling bridge 12 functions as a longitudinal coupler, which has as a consequence that in the resonator 11 there is excited a bending vibration running in the direction of the double arrow 3. Since the resonator 11 is likewise provided with diagonally oppositely situated flattened portions 22, in the manner previously described, a bending vibration perpendicular to the vibration direction 3 is excited in the resonator 11, which extends in the direction of the double arrow 4. On the electrostrictive plates 17 and 18 there is impressed an oppositely directed polarization in the direction of the arrows 36 and 37, and on the plates 19 and 20 an oppositely directed polarization in the direction of the arrows 38 and 39. As in the resonator 10, the plates 17 and 18 in the resonator 11, which lie in the upper vibrator half are polarized oppositely to the plates 19 and 20 lying in the lower half. Accordingly, through the bending vibrations extending in the direction of the arrow 4, the electrostrictive plates 17 and 18 are expanded, while simultaneously the plates 19 and 20 are contracted, which condition is reversed in the following half-cycle of the bending vibration, so that between the outer parts and the middle portion of the resonator 11 there, thus results an alternating voltage which can be obtained over the connecting conductors 29, 29', and 30 at the respective terminals 25 and 26 as an output alternating voltage $U_2$.

The coupling bridge 12, besides acting as a longitudinal coupler, simultaneously also acts as a bending coupler, which additionally couples the vibration mode at the resonator 10 extending in the direction of the double arrow 1 with the vibration mode at the resonator 11 extending in the direction of the double arrow 4. In this manner there results an additional coupling between the vibration modes 1 and 4, in which the vibration mode 2 and the vibration mode 3 generated by the longitudinal coupling are passed over. As will be subsequently explained, this additional coupling of the two vibrators 10 and 11 over the bending coupling of the coupling bridge 12 yields two attenuation poles in the attenuation characteristics of the filter, of which the one lies below and the other above the filter pass range.

Figure 2:
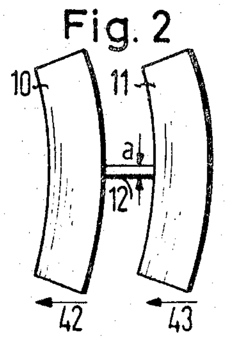
Figure 3:
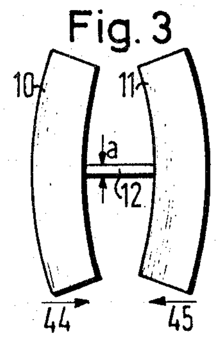

The forms of vibration for the resonators 10 and 11 for the coupling bridge 12 are separately represented schematically in FIGS. 2 to 5. FIGS. 2 and 3 show the effect of longitudinal coupling when the filter is viewed in the direction B, as indicated in FIG. 1. There exists the possibility that the resonators 10 and 11 will vibrate in like phase, so that the coupler 12 is not engaged for tension or pressure, which possibility is indicated in FIG. 2 by the arrows 42 and 43. There also exists, however, the possibility, as shown in FIG. 3, that the resonators 10 and 11 will vibrate in counterphase to one another, corresponding to the arrows 44 and 45, so that the coupling bridge 12 is connected for a push-pull action in the transmission of the vibration.

Figure 4:
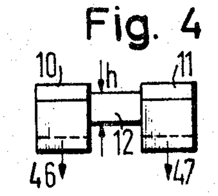
Figure 5:
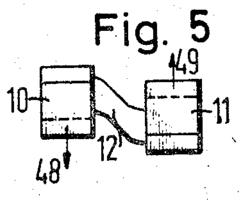

FIGS. 4 and 5 illustrate the two transmission forms for the bending vibration of the coupling bridge 12 when the filter is viewed in the direction C, as indicated in FIG. 1. There also here exists the possibility that the resonators 10 and 11, as indicated in FIG. 4, will vibrate in like phase according to arrows 46 and 47, so that the coupling bridge 12 itself will not be engaged in the transmission of the bending vibration. The counterphase vibration of the two resonators 10 and 11, which extends in the direction of the arrows 48 and 49 is represented in FIG. 5, in which case the coupling bridge 12 is connected for bending in the transmission of the vibration. The like-phase and counter-phase vibration states represent in each case vibrations of the filter system. In FIGS. 1 to 5, the coupling bridge 12 has a rectangular cross-section with the width $a$ and the height $h$. Since, aside from the resonator dimensions, the material constants and the length of the coupling bridge, the amount or strength of the longitudinal coupling of cross-section A, that is, of the product $A=a\cdot h$, and the amount or strength of the bending coupling are dependent on the surface inertia moment $I=ah^3/12$, both couplings may be determined independently of one another, whereby simultaneously the filter band width and also the distance apart of the attenuation poles lying below and above the filter pass range are freely selectable.

Figure 6:
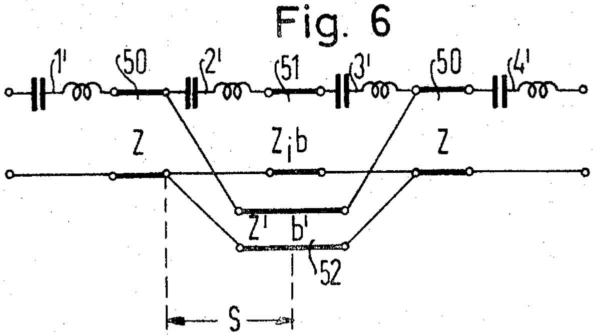
FIG. 6 is an equivalent electrical circuit diagram of a mechanical filter constructed according to FIG. 1.

FIG. 6 illustrates the equivalent electrical circuit diagram of a mechanical filter constructed according to FIG. 1. To the four vibration modes 1 to 4 there correspond four series resonance circuits 1' to 4', which are coupled with one another over transmission elements 50 and 51. The transmission elements 50 here correspond to the flattened portions 22, and can each be conceived as a transmission line with the wave impedance Z and the phase angle of 90°. The transmission section 51 represents the coupling of the two resonators over the longitudinal coupling and should have the wave impedance Z and the phase angle $b$. The transmission section 52 connected in parallel with the resonance circuits 2' and 3' and to the coupling line 51 represents the additional coupling over the bending coupling of the coupling bridge and has the wave impedance Z′ and the phase angle $b'$.

Figure 7:
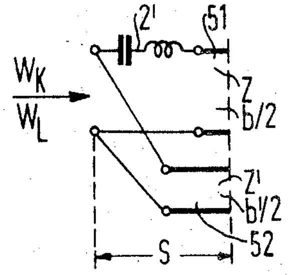
FIG. 7 illustrates the portion of FIG. 6 designated in the latter by the letter S.

In FIG. 7 there is individually illustrated the filter section designated in FIG. 6 by the letter S. This filter section presents a filter-half member, which consists of the resonance circuit 2′, and the half transmission section 51 (wave impedance Z, phase $b/2$), to which the half transmission section 52 (wave impedance Z′, phase $b'/2$) is connected in parallel. The attenuation poles of a symmetrical four-pole, as is well known, lie at the frequencies for which the difference between short circuit and no-load impedance ($W_K-W_L$) of the half four-pole is zero. If there is assumed (only four the simplification of the calculation), for the phase $b$ a value of 90°, then the calculation yields a distance apart $B_\infty$ of the attenuation poles with reference to a reference band width B.

$$\frac{B_\infty}{B}\approx\frac{1}{2}\sqrt{1+\frac{Z'}{Z}\sin b'} \qquad (1)$$

If the phase $b'$ of the line 52 is selected at 90°, and on the other hand, the phase angle of the line 51 deviates from 90° then there results for the distance apart $B_\infty$ of the attenuation poles the relation represented in Equation 2, if simultaneously for the wave impedances Z and Z′ there are substituted in Equation 1 the formulas containing the cross sectional dimensions of the coupling bridge:

$$\frac{B_\infty}{B}\approx\frac{1}{2}\cdot\sqrt{1+\frac{1}{\sqrt{2}\sin b}\cdot\sqrt{\frac{v}{\omega_0}}\sqrt[4]{\frac{A}{I}}} \qquad (2)$$

In Equation 2, $v$ signifies the velocity of sound for the material utilized for the coupling bridge, $\omega_0=2\pi f_0$ with $f_0$ as the band center frequency of the filter, A the cross-sectional area of the coupling bridge, and I the surface moment of inertia in direction of the bending vibration of the coupling bridge.

In an analogous manner it is possible, instead of a coupling bridge with rectangular cross-section, to utilize a coupling bridge with circular cross-section. If the coupling bridge here has the diameter D, there then results for the distance $B_\infty$ of the attenuation poles with respect to a reference band width B the value apparent from Equation 3.

$$\frac{B_\infty}{B}\approx\frac{1}{2}\cdot\sqrt{1+\frac{1}{\sin b}\sqrt{\frac{2v}{\omega_0 D}}} \qquad (3)$$

In Equation 2, $v$ signifies the velocity of sound for the to the 3-db band width of vibration circuit 2′ (FIG. 7) with reference to the frequency $f_0$ and the wave impedance Z of a 90° coupling line 51.

In Equations 1 to 3 it is assumed that the phases $b$ and $b'$ lie in 180° ranges which generate attenuation poles at real frequencies. If one of the thus established phases $b$ or $b'$ is shifted, by adding a phase of, for example 180°, in likewise 180° intermediate ranges, there then result attenuation poles at imaginary frequencies. This position of the attenuation poles can be utilized in a manner in itself known for influencing the phase angle.

Figure 8:
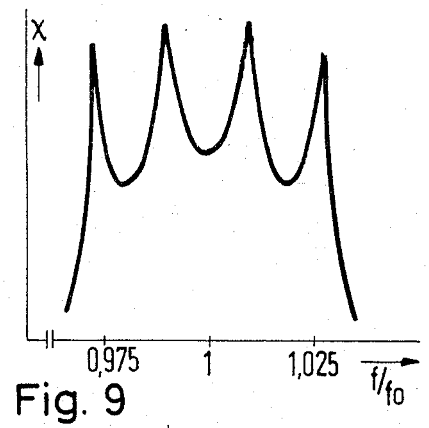
FIG. 8 illustrates how the action of a four circuit filter may be achieved with only two resonators.

In FIG. 8, for the clarification of the double utilization of the resonators the amplitude X of the output voltage $U_2$ is represented in dependance on a frequency ratio $f/f_0$ when the output voltage $U_2$ is derived over a very loose coupling and the resonator 10 (FIG. 1) is excited on the input side over a very loose coupling. As will be seen from FIG. 8, there result four maximal values of the output amplitude X which lie symmetrical to the central frequency $f_0$. This behaviour corresponds to that of a four-circuit band filter such as is represented in FIG. 6 by the series resonance circuits 1′ to 4′. Through the double utilization of the resonators there can be achieved accordingly, merely with two resonators, the behaviour of a four-circuit band filter.

Figure 9:
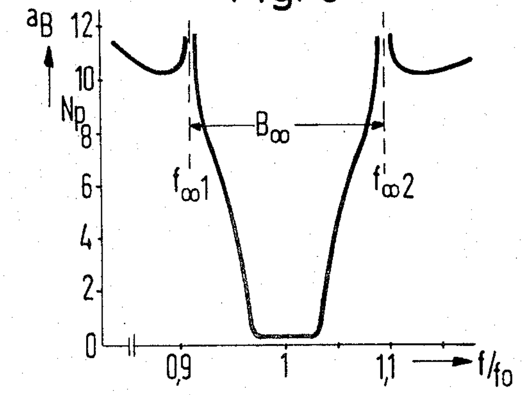
FIG. 9 illustrates the operational attenuation of a filter constructed according to FIG. 1.

In FIG. 9 the attenuation behaviour of a filter constructed according to FIG. 1 is depicted with the operating attenuation $a_B$ being plotted in dependence on a frequency ratio $f/f_0$. From the attenuation behaviour there are clearly to be derived the pole frequencies $f_{\infty_1}$ and $f_{\infty_2}$ lying on both sides of the filter pass range. As already mentioned, the distance apart $$B_\infty=\frac{f_{\infty 2}-f_{\infty 1}}{f_0}$$

can, within wide, limits be freely determined through the selection of the bending coupling.

Through the double utilization of the vibrators and of the coupling bridges it is possible, accordingly, to construct an $n$-circuit filter with only $n/2$ resonators, in which $2(n/2-1)$ attenuation poles are achieveable. There frequently results in mechanical filters attenuation break-through in the blocking range and distortion of the attenuation behaviour in the pass range, not only through the types of vibration possible in the individual resonators, but also through a further type of vibrations which are caused by inherent resonances of the entire vibration system of a mechanical filter. The number of these resonances also becomes greater as the number of resonators increases. If it is possible therefore, to fulfill a prescribed attenuation pattern with the lowest possible number of resonators, as occurs, for example, according to the invention through the double utilization of the resonators, there then results from such construction a filter which is extremely poor with respect to the side waves. The demand for freedom from side waves is still further met by the fact that side vibrations, which may result, for example, through manufacturing tolerances in the resonators, are counteracted by a deliberately generated asymmetry in the total behaviour of the filter. There also is the further point that the longitudinal coupling of the bending vibrator with respect to the coupling degree is especially effective, so that also in the case of wide-band filters, coupling bridges of low stiffness result, which again counteracts the creation of side waves. A further advantage of the system according to the invention is to be seen also in the low spatial requirements, which, as already mentioned, acts against the creation of side waves, and makes possible as extremely compact and space-saving construction of the entire filter.

Figure 10:
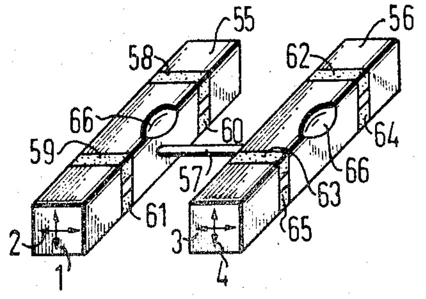
FIG. 10 illustrates a further modification of the invention employing two resonators.

In FIG. 10 there is depicted another embodiment of the invention, in which two resonators 55 and 56 are coupled with one another over a coupling bridge 57. Into the resonators 55 and 56 there are introduced the plates 58 to 65 consisting of electrostrictive material, which are secured by soldering. The mechanical and the electrical operation of the filter illustrated in FIG. 10 corresponds completely to that illustrated in FIG. 1. Deviating therefrom is the type of coupling of the vibration modes 1 with 2 and 3 with 4, respectively. This coupling is achieved by a sickle or almond-shaped recesses 66, which are disposed in the diagonals of each of the square vibrators 55 and 56. The coupling bridge 57 here has a circular cross-section. In a corresponding polarization of the electrostrictively active plates 58 to 65 the electrical behaviour of this filter can be traced back to an equivalent electrical circuit diagram according to FIG. 6. Instead of recess 66 there also can be arranged, for the coupling of the vibration modes 1 and 2 and 3 and 4, respectively, one or more protuberances extending on the resonators extending in the direction of the diagonals. For the coupling of the two vibrations standing perpendicular to one another merely as asymmetry in the resonators is necessary.

Figure 11:
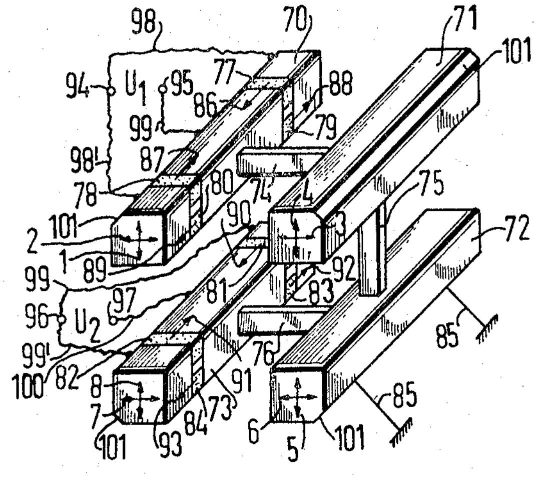
FIG. 11 illustrates a modification of the invention employing four resonators.

In further development of the concept of the invention, there is represented in FIG. 11 a mechanical filter, which consists of the resonators 70, 71, 72 and 73. The individual resonators are coupled with one another over the rectangular coupling bridges 74, 75 and 76. The two end resonators 70 and 73 are provided, in a manner, in itself known, with electrostrictively active plates 77 to 84. With the aid of the two supporting wires 85, which are fastened in vibration nodes of the bending vibration and which are favorably arranged at an angle of 45° to the lower boundary surface of the resonator 72, the filter can be mounted in a casing (omitted in the drawing in the interest of clarity).

By applying an input alternating voltage $U_1$ to the connector terminals 94 and 95 the resonator 70 is excited into bending vibrations in the direction of the double arrow 1, since the electrostrictive plates 77 and 78 are oppositely polarized to one another in the direction of arrows 86 and 87 and, accordingly, in a half cycle of the electrical alternating voltage $U_1$, expand under the influence of the electrical field, while simultaneously, the plates 79 and 80, being oppositely polarized in the direction of the arrows 88 and 89, contract. The supplying of electrical alternating voltage to the outer parts of the resonator 70 takes place over the connector conductors 98 and 98' and to the middle portion over the conductor 99. When the frequency of the input voltage $U_1$ agrees approximately with the resonance frequency of the resonator 70, bending vibrations are produced in the direction of the double arrow 1. Through the flattened portions 101 the square resonators are asymmetrical, whereby there is excited at resonator 70 also a bending vibration in the direction of the double arrow 2. This vibration is transmitted over the coupling bridge 74 to the resonator 71 and there excites a bending vibration extending in the direction of the double arrow 3. As a result of the asymmetry produced by the flattened portion 101 on the resonator 71 a further bending vibration is excited in the direction of the double arrow 4. The coupling of the vibration modes 2 and 3 takes place over the coupling bridge 74, acting as longitudinal coupler. Simultaneously the vibration mode 1 is coupled with the vibration mode 4 over the bending coupling of the coupling bridge 74, so that the vibration modes 1 and 4 are coupled additionally with one another, with a passing over of the vibration modes 2 and 3. Analogously to this there extends the coupling of the vibration mode 4 with the vibration mode 5, for which the coupling bridge 75 in turn acts as longitudinal coupler. The vibration mode 6 generates over the coupling bridge 76, through the longitudinal coupling, the bending vibration extending in the direction of the double arrow 7. Through the flattened portions 101 there are excited, moreover, in the resonators 72 and 73, bending vibrations running in the direction of the double arrows 5 and 8. Through the bending coupling of the coupling bridges 75 and 76 there is additionally coupled the vibration mode 3 with the vibration mode 6 and the vibration mode 5 with the vibration mode 8. Through these additional couplings, over the bending coupling of the individual coupling bridges, it is possible, in the manner already described in the embodiment of FIG. 1, to create attenuation poles in the blocking range of the filter at any desired frequency position.

In the embodiment of FIGS. 1 to 11 mechanical resonators with square cross-section are utilized. In like manner mechanical resonators of circular cross section are also usable. It is then merely necessary to take care that for the excitation of two bending vibrations standing perpendicularly to one another, the circular resonators also have to be provided with an asymmetry, such as, for example, a flattened portion, a sickle or almond-shaped recess and/or a sickle or almond-shaped protuberance. This asymmetry is favorably so applied to the vibrators that it extends at an angle of about 45° to the two directions of vibration.

Changes may be made within the scope and spirit of the appended claims which define what is believed to be new and desired to have protected by Letters Patent.

We claim:

1. An electromechanical filter comprising at least two mechanical resonators which are coupled with one another by a coupling bridge, executing bending vibrations, transducer means operatively connected to said resonators for the transition from electrical to mechanical vibrations and from mechanical to electrical vibrations, at least one asymmetry provided on each resonator, the dimensions and configurations of said resonators and asymmetries being so selected that two bending vibrations, perpendicular to one another are created approximately at the same frequency, coupled with one another by the asymmetry of the associated resonator, said coupling bridge being connected to said resonators in the zone of a vibration loop corresponding to the bending vibrations and executing two bending vibrations, corresponding to the two bending vibrations of said resonators.

2. An electromechanical filter according to claim 1, wherein the resonators comprise bars with square cross-section, in which at least one corner edge is flattened, preferably over the entire length of the bar, forming the asymmetry, and the coupling bridge has a rectangular cross-section.

3. An electromechanical filter according to claim 1, wherein the resonators comprise bars with square cross-section, in which at least one corner edge is flattened, preferably over the entire length of the bar, forming said asymmetry, and the coupling bar has a circular cross-section.

4. An electromechanical filter according to claim 1 wherein each asymmetry comprises an almond-shaped formation on the associated resonator, and the coupling bridges have a rectangular cross section.

5. An electromechanical filter according to claim 1, wherein each asymmetry comprises an almond-shaped formation on the associated resonator, and the coupling bridges have a circular cross-section.

6. An electromechanical filter according to claim 4, wherein each asymmetry is in the form of a recess in the associated resonator.

7. An electromechanical filter according to claim 4, wherein each asymmetry is in the form of a protuberance on the associated resonator.

8. An electromechanical filter according to claim 1, wherein the resonators consist of bars of circular cross-section and each asymmetry comprises a flattened portion which preferably extends over the entire vibrator length, and the coupling bridges have a rectangular cross-section.

9. An electromechanical filter according to claim 1, wherein the resonators consist of bars of circular cross-section and each asymmetry comprises a flattened portion which preferably extends over the entire vibrator length, and the coupling bridges have a circular cross-section.

10. An electromechanical filter according to claim 1, wherein said filter comprises at least three resonators serially connected by respective coupling bridges, the end resonators each having transducer means associated therewith, the coupling bridges associated with an intermediate resonator having their longitudinal axes extending perpendicular to one another.

11. An electromechanical filter according to claim 10, wherein said filter comprises four resonators, symmetrically arranged with the longitudinal axes of the coupling bridges connected to the respective end resonators extending parallel to one another, and the longitudinal axis intermediate coupling bridge extending perpendicularly to the axes of the end coupling bridges.

12. An electromechanical filter according to claim 1, wherein the transducer means for the associated resonator comprises a plurality of plates subdividing such resonator, a pair of such plates being disposed at each subdivision, the plates of each pair being oppositely polarized, operative upon actuation by an alternating potential to produce bending vibrations in such resonator.

13. An electromechanical filter according to claim 5, wherein each asymmetry is in the form of a recess in the associated resonator.

14. An electromechanical filter according to claim 5, wherein each asymmetry is in the form of a protuberance on the associated resonator.

References Cited

UNITED STATES PATENTS 3,015,789 1/1962 Honda -------------- 333—71

ROY LAKE, *Primary Examiner.*

DARWIN R. HOSTETTER, *Examiner.*